(12) United States Patent
Monsen et al.

(10) Patent No.: US 8,553,805 B2
(45) Date of Patent: Oct. 8, 2013

(54) METHOD AND APPARATUS FOR SUBBAND SIGNAL DEMODULATION IN A TRANSPONDER SATELLITE COMMUNICATION LINK CONTAINING A COMPONENT OF RELAYED INTERFERENCE

(75) Inventors: Peter Monsen, Stowe, VT (US); David Bagby, Atascadero, CA (US)

(73) Assignees: Peter Monsen, Stowe, VT (US); Datum Systems, Inc., San Jose, CA (US)

( * ) Notice: Subject to any disclaimer, the term of this patent is extended or adjusted under 35 U.S.C. 154(b) by 319 days.

(21) Appl. No.: 13/101,652

(22) Filed: May 5, 2011

(65) Prior Publication Data

US 2011/0299572 A1 Dec. 8, 2011

Related U.S. Application Data

(60) Provisional application No. 61/343,951, filed on May 5, 2010.

(51) Int. Cl.
*H03K 7/06* (2006.01)

(52) U.S. Cl.
USPC ........... 375/302; 375/219; 375/261; 375/295; 375/322; 375/327

(58) Field of Classification Search
None
See application file for complete search history.

(56) References Cited

U.S. PATENT DOCUMENTS

| | | | |
|---|---|---|---|
| 5,596,439 A | 1/1997 | Dankberg et al. | |
| 6,011,952 A | 1/2000 | Dankberg et al. | |
| 6,118,976 A * | 9/2000 | Arias et al. | 725/118 |
| 6,725,017 B2 | 4/2004 | Blount et al. | |
| 6,859,641 B2 | 2/2005 | Collins et al. | |
| 6,907,093 B2 | 6/2005 | Blount et al. | |
| 7,016,644 B2 | 3/2006 | Sun | |
| 7,228,104 B2 * | 6/2007 | Collins et al. | 455/63.1 |
| 7,327,777 B2 * | 2/2008 | Bergstrom et al. | 375/140 |
| 7,522,877 B1 * | 4/2009 | Avellan et al. | 455/12.1 |
| 7,978,668 B2 * | 7/2011 | Wang et al. | 370/338 |
| 7,991,373 B2 | 8/2011 | Miller et al. | |
| 8,050,368 B2 * | 11/2011 | Lerner et al. | 375/346 |
| 8,346,162 B1 * | 1/2013 | Jayasimha et al. | 455/13.1 |
| 8,401,493 B2 * | 3/2013 | DeLeon | 455/76 |
| 2010/0201398 A1 * | 8/2010 | Zhao et al. | 326/52 |
| 2010/0260234 A1 * | 10/2010 | Thomas et al. | 375/141 |
| 2011/0299572 A1 * | 12/2011 | Monsen et al. | 375/214 |
| 2012/0224549 A1 * | 9/2012 | Myers et al. | 370/329 |
| 2013/0114649 A1 * | 5/2013 | Lachman et al. | 375/211 |

* cited by examiner

*Primary Examiner* — Hirdepal Singh
(74) *Attorney, Agent, or Firm* — Edwards Wildman Palmer LLP; Steven M. Jensen

(57) ABSTRACT

A method and apparatus at a local terminal are described for demodulating a remote-terminal signal located at a subband offset frequency in a frequency subband of relayed interference from a transponder satellite link. The demodulation of the remote-terminal signal is accomplished by transferring the digital data that produced the local-terminal transmit signal to the local-terminal receiver. The digital data is time-delayed and converted to a narrowband offset-constellation signal that cancels the relayed interference in an adaptive equalizer. Providing cancellation in the subband of the relayed interference produces larger interference cancellation factors than those obtained in conventional broadband cancellation systems. A phase-noise error signal is also generated and used to increase cancellation levels limited by phase noise generated in the satellite link frequency converters. Additionally the receiver converter frequencies are chosen such that errors in estimating the subband offset frequency do not affect cancellation in the adaptive equalizer.

16 Claims, 6 Drawing Sheets

METHOD AND APPARATUS FOR SUBBAND SIGNAL DEMODULATION IN A TRANSPONDER SATELLITE COMMUNICATION LINK CONTAINING A COMPONENT OF RELAYED INTERFERENCE

CROSS-REFERENCE TO RELATED APPLICATION

This application claims the benefit of application U.S. Provisional Application Ser. No. 61/343,951 filed on May 5, 2010, the disclosure of which is expressly incorporated herein by reference in its entirety.

BACKGROUND OF THE INVENTION

This invention relates to the demodulation of a remote-terminal signal in the presence of interference at a receiver in a local terminal of a point-to-multipoint radio communication link wherein the interference results from a subband component of a transmitted signal at the local terminal that has been relayed back to the local receiver by a satellite transponder link. The relayed-interference signal received at the local terminal is a result of effects on the transmitted signal by the satellite uplink to the transponder, the frequency translation and amplification in the transponder, and the satellite downlink back to the local terminal. These effects modify the transmitted signal to produce the relayed-interference signal that has different amplitude, phase, frequency, and delay parameters as well as frequency dispersive parameters such as group delay. In certain prior art systems, because the transmitted signal is conventionally produced as an intermediate frequency (IF) transmit signal in the modulator in the local terminal, it is possible to transfer the IF transmit signal to the local terminal receiver and create a corresponding reference signal to the transmitted signal. The reference signal can then be appropriately modified for purposes of interference cancellation. With an acceptable level of interference cancellation, the frequencies in the transmitted signal bandwidth can be reused for satellite communication to the local receiver from other remote sites.

The invention is applied in particular to an asymmetrical point-to-multipoint satellite communication application wherein a hub terminal communicates with multiple remote terminals over a duplex satellite communications link in which a loop-back transponder sends a transmitted signal to all the terminal receivers. In this asymmetrical satellite application each of the remote terminal signals have conventionally much smaller bandwidth than that of the hub terminal transmitted signal. The transponder is designated loop-back or alternatively "bent-pipe" as its operation is limited to bandpass filtering, frequency translation, and amplification and does not include demodulation and remodulation. Conventionally such a satellite communication link can only transmit and receive signals in one direction for a single access use. For example in a frequency-division multiple access system, a separate bandwidth allocation for the hub terminal and a separate bandwidth allocation for a remote terminal would be necessary for communication in both directions. However, the interfering signal at the transmitter terminal could be generated at the same terminal receiver to cancel its "self" interference thus providing reuse of the frequencies in the hub terminal bandwidth allocation for return link communication between the remote terminal and the hub terminal.

Conventionally in this asymmetrical application a hub terminal employs a larger diameter antenna, with gain $G_H$, than a remote terminal with an antenna of gain $G_R$, such that $G_H \gg G_R$. Hub terminal antennas may be as large as 18 meters and remote terminal antennas may be as small as 1.2 meters producing an antenna gain differential of approximately 24 dB. For both signal directions the received bit energy is proportional to the antenna gain product $G_H G_R$ and the transmitted energy per bit. In data transmission with a fixed modulation type the bit error probability is proportional to the received bit energy so since the antenna gain product is the same in both directions the transmitted energy per bit can be about the same for the hub-to-remote direction as for the remote-to hub direction. However, because the transponder relays the transmitted signal back to the same terminal, the relayed interference signal has received bit energy proportional to the local terminal antenna gain squared. Consequently, the ratio of signal to interference spectral density at the remote terminal is $G_H/G_R$ whereas that ratio at the hub terminal is equal to the reciprocal $G_R/G_H$. Since this asymmetric satellite application has $G_H \gg G_R$, there is generally no interference problem for reused frequencies at the remote terminal and a big interference problem for reused frequencies at the hub terminal. In satellite systems, bit-error rate performance goals are typically within 0.3 to 0.5 dB of theoretical limits. The cancelled relayed-interference signal is approximately complex Gaussian distributed so that its power adds to the channel noise at the receiver. If 0.4 dB is allocated for performance degradation due to a residual relayed-interference signal, the cancellation must push the relayed-interference signal approximately 10 dB below the noise. Additionally for the hub terminal signal, there is generally a larger fade margin requirement and a larger energy per bit requirement due to a higher order modulation. These two factors can increase the relayed interference signal by an additional 6 dB relative to the desired remote terminal signal. Thus, for a signal-to-noise ratio of 5 dB for the desired remote terminal signal, the required cancellation would be equal to 24+6+5+10=45 dB.

In addition to 45 dB of required cancellation, there is a very large dynamic range required for baseband digitizing the received signal at the hub terminal so as to successfully capture the weak desired remote terminal signal buried in the strong relayed-interference signal. The hub terminal conventionally sends separate signals with a single carrier in a time-division multiplexed (TDM) format to each of the remote terminals. The remote terminal sends back information to the hub terminal on a single carrier as part of a frequency-division multiplexed (FDM) format or a combination of FDM and TDM formats. Accordingly, the symbol rate for the hub terminal, $R_H$, is much larger than a remote terminal symbol rate, $R_R$. Typical values for symbol rates would be 10 MHz for the hub terminal signal and 50 kHz for the remote terminal signal, a dB difference of 23 dB. The ratio of signal to interference power at the hub terminal is the spectral density ratio difference with a maximum of about 30 dB, as discussed above, plus 10 LOG $(R_R/R_H)$. Thus, for conventional systems the interference power can be about 30+23=53 dB larger than the remote received signal power at the hub terminal. For successful demodulation of the remote-terminal signal the dynamic range at the hub terminal receiver must be significantly larger than this value.

The frequency converter in the satellite upconverter for the transmitted signal path and frequency converter in the satellite downconverter in the received signal path both add phase noise variations that when combined are on the order of 30 to 40 dB smaller than the hub terminal signal. Since the maximum required cancellation is about 45 dB, it is clear that these phase noise variations need to be compensated if cancellation goals are to be attained.

Prior art systems have been developed to provide multiple-access reuse in full-duplex satellite communication systems operation with a loop-back transponder. These systems use signals associated with the terminal transmitter to produce a reference signal for purposes of cancellation of the "self" interference at the receiver. U.S. Pat. No. 5,596,439, "Self-Interference for Two-Party Relayed Communication", Mark D. Dankberg, et al., discloses an open-loop technique consisting of measurement techniques followed by interference reduction based on measured link parameters that are applied to the reference signal. Errors in parameter measurement can significantly degrade the subsequent interference reduction. It is generally recognized that an adaptive closed-loop system can be more effective in cancellation systems with variable link parameters.

U.S. Pat. No. 6,859,641 B2 "Adaptive Canceller for Frequency Reuse Systems", Glen D. Collins, et al. ("'641 patent"), and U.S. Pat. No. 7,228,104 B2 "Adaptive Canceller for Frequency Reuse Systems", Glen D. Collins, et al., ("'104 patent"), disclose an adaptive cancellation system that converts a sample of the IF transmitted signal to digital form and converts the IF received signal containing the relayed interference to digital form. Frequency, phase, gain, and delay parameters of the sample of the transmitted signal are adjusted to produce a compensating signal that is added to the digital form received signal to produce a signal of interest. The signal of interest can be converted back to an intermediate frequency for interface with a down-stream demodulator.

U.S. Pat. No. 7,522,877 B1 "Noise Reduction System and Method Thereof", Abel Avellan, et al., ("'877 patent"), discloses an interference-reduction system for the hub terminal in the asymmetrical satellite communication configuration described above. The interference-reduction system digitizes and converts to baseband the hub terminal IF transmit signal and transfers the bits in the baseband digital signal to a buffer in the hub receiver to produce a replica of the hub transmitted signal. The replica is then scaled, delayed and distorted to reduce the transponder-relayed hub interference signal in the aggregate received signal that also contains multiple remote terminal signals. A finite-impulse-response (FIR) filter forms the basis for an adaptive delay equalizer that uses a set of real weights that adapt to compensate for fractional-sample delay errors. Since the interference reduction is over the hub signal bandwidth rather than a single remote terminal signal subband, the effects of nonlinearities in the hub transmitter can critically limit interference reduction. Accordingly, the '877 patent discloses the generation of AM-Normgain and AM-PM correction arrays that are used for the distortion modification of the hub transmitted signal replica.

The Collins '641 and '104 patents and the Avellan '877 patent also disclose transfer from the hub transmitter to the hub receiver of the IF transmit signal. By using this signal, problems associated with variations in the transmitted amplitude and data clock are avoided. However transferring the IF transmit signal requires a significantly larger bit transfer rate than transferring the digital data signal that produces the IF transmit signal resulting in a higher cost system. Further, the Collins '641 and '104 patents and the Avellan '877 patent do not address the large dynamic range required and the limitation of cancellation caused by the presence of frequency-converter phase noise as discussed above.

It is further recognized that a critical problem to be solved in these interference reduction systems is precise tracking of frequency and time-delay error. The frequency errors include local oscillator variations in the satellite upconverter for the transmitted signal path, local oscillator variations in the satellite downconverter in the received signal path, and Doppler error due to satellite motion. Time-delay errors result from variation in path delay between a terminal and the satellite due to satellite motion. Intelsat satellites for example, have a maximum delay variation of about 0.43 milliseconds peak to peak over a 24-hour period. The moon's gravitational pull also interacts with the satellite orbit. For Intelsat satellites the maximum rate change is about 15.4 nanoseconds/second. Other satellite operators may have higher numbers. These frequency and time-delay errors are present in both the interfering transmit signal component and desired remote-terminal signal component in the received signal. Because of the different paths to and from the satellite these errors are not the same for both components.

Accordingly, there is a need at a hub terminal in these asymmetrical satellite link applications for demodulation of a remote-terminal signal that includes cancellation of a component of relayed-interference signal in the remote-terminal signal subband in the face of frequency-converter phase noise and multiple varying link parameters that can significantly degrade the cancellation factor.

SUMMARY OF THE INVENTION

The object of the invention is to provide a method and apparatus for demodulating a remote-terminal signal located in a frequency subband of relayed interference in a transponder satellite link. An additional object of the invention is to achieve and maintain a large cancellation factor of the frequency-subband component of relayed interference under conditions where the remote-terminal signal and relayed interference have been modified by unknown and time-varying parameters. An additional objective of the invention is to provide a large cancellation factor in the presence of frequency-converter phase noise.

In one aspect of the invention there is disclosed a method for producing a demodulated subband signal in an asymmetrical point-to-multipoint satellite radio link at a hub communication terminal that transmits a digital-data signal to a plurality of remote terminals and that receives a received signal that contains a subband signal from a remote terminal and relayed interference corresponding to a modified version of the transmitted signal that has been relayed by the satellite transponder. The subband signal has an associated subband symbol waveform that in an asymmetrical satellite link has at an offset frequency a generally much smaller bandwidth than the bandwidth of the relayed interference. The method includes offset-frequency converting and match filtering, with the subband symbol waveform, the received signal to produce a narrowband-received signal. The digital data along with magnitude and timing measures are distributed to a plurality of communications receivers. At a communications receiver associated with a remote-terminal signal a constellation signal is produced from delayed digital data and is subsequently offset-frequency converted and match filtered, with the subband symbol waveform, to produce a narrowband offset-constellation signal. A complex equalizer weight is applied to the narrowband offset-constellation signal and the resulting product is summed with the narrowband-received signal to produce the demodulated subband signal with reduced relayed interference. The demodulated subband signal is an optimum receiver estimate of the transmitted remote-terminal constellation signal. This estimate can be conventionally constellation detected to find the closest possible transmitted constellation symbol value that then determines associated remote-terminal digital data values. In order to reduce the effects of frequency-converter phase noise, a phase-noise estimate is derived and applied to the narrowband-offset constellation signal.

In a second aspect of the invention there is disclosed a demodulator for producing a demodulated subband signal in a communication terminal that includes a transmitter that transmits a digital-data signal in a transmitted signal and includes a receiver that receives a received signal that contains a subband signal and relayed interference corresponding to a modified version of the transmitted signal. The subband signal is at an offset frequency and includes a subband symbol waveform that has a bandwidth small compared to the relayed interference. The demodulator includes a wideband-baseband converter that converts the received signal to produce a wideband-received signal and a buffer that time delays a receiver-replica digital-data signal to produce a delayed digital-data signal. The demodulator includes an offset basebandconverter that offset-frequency converts the received signal and a signal-component matched filter with the subband symbol waveform that provides a subband equalizer with a narrowband-received signal. The subband equalizer is also provided a narrowband offset-constellation signal that is derived from processing the delayed digital-data signal with a constellation modulator to provide a constellation signal to an offset converter/filter. The offset converter/filter includes offset-frequency converting the constellation signal and subsequent matched filtering with the subband symbol waveform. In the preferred embodiment of the invention the receiver-replica digital data is produced from the digital data that is distributed along with magnitude and timing measures to the communications terminal receiver by a local area network. In an alternate embodiment in this second aspect the receiver-replica digital data is produced from demodulation of the wideband-received signal. In the subband equalizer a complex equalizer weight is applied to the narrowband offset-constellation signal and the resulting product is summed with the narrowband-received signal to produce the demodulated subband signal with reduced relayed interference. In order to reduce the effects of frequency-converter phase noise, a phase-noise estimate is derived and applied to the narrowband offset-constellation signal in the offset converter/filter.

DETAILED DESCRIPTION OF THE INVENTION

In the above prior art systems techniques the demodulation of a remote-terminal signal in a point-to-multipoint satellite application are not disclosed and the interference cancellation is broadband in that it includes all of the remote terminal signals in the bandwidth occupied by a wideband hub interference signal. The larger the bandwidth the more difficult it is to achieve a large interference cancellation (on the order of 45 dB) in the presence of link parameter variations. Consequently, a technique that performs the interference cancellation in the smaller bandwidth corresponding to the frequency subband of the remote-terminal signal has potential to provide improved interference discrimination. Further the technique of simultaneously performing interference cancellation and remote-terminal signal demodulation allows for the use of optimum filtering against noise to reduce dynamic range requirements and provide superior demodulation performance. This approach requires a separate canceller/demodulator for each hub receiver but offers the possibility to achieve a larger cancellation factor.

Figure 1:
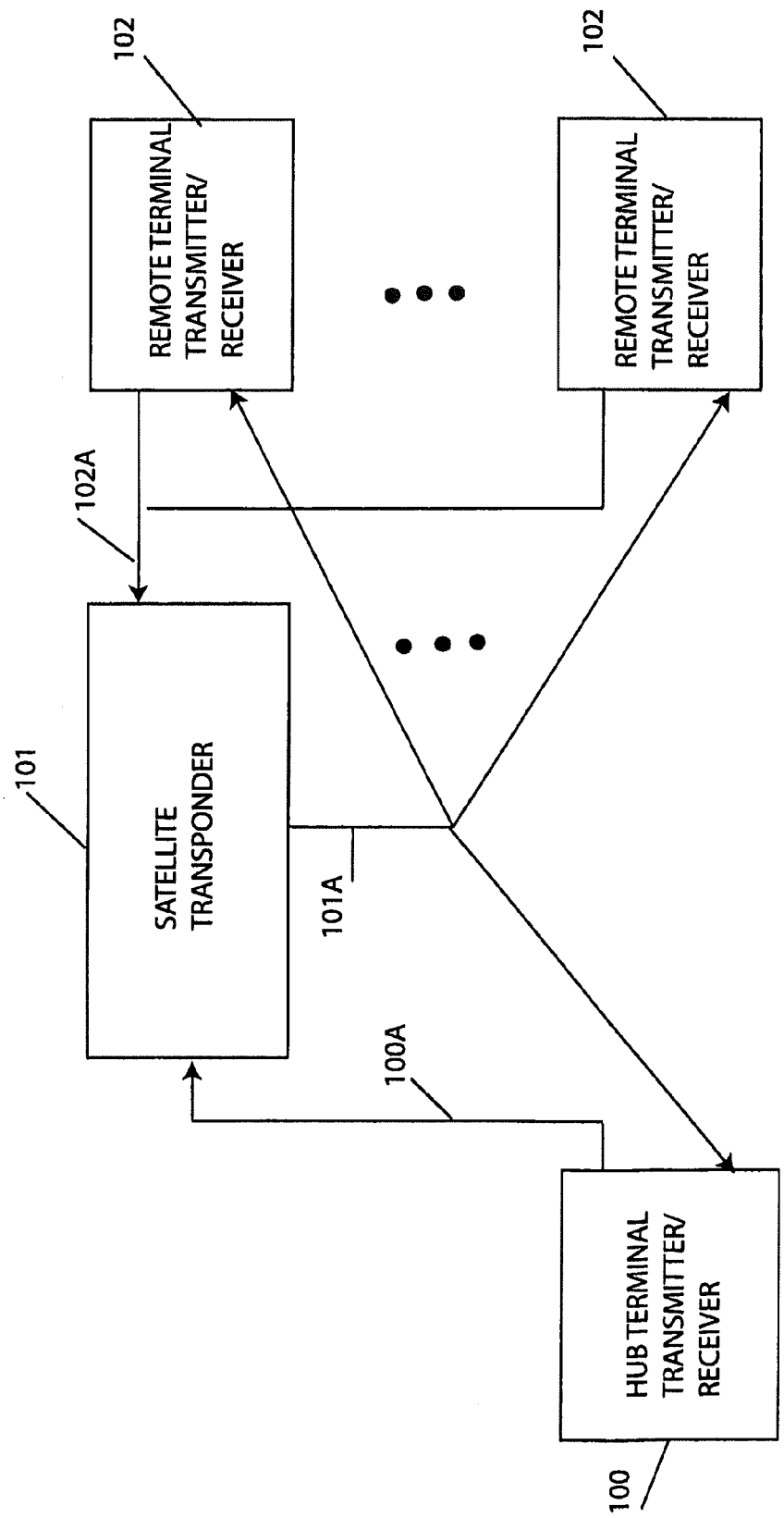
FIG. 1 is a diagram of a full-duplex point-to-multipoint satellite communication link between a hub terminal and a plurality of remote terminals.

An asymmetrical point-to-multipoint satellite communication link with a hub terminal 100 transiting a satellite transponder 101 and connecting to a plurality of remote terminals 102 is shown in FIG. 1. The transmitter/receiver at the hub terminal 100 and the transmitter/receiver at each distant remote terminal 102 provide full duplex communication through satellite transponder 101. The transponder operation is limited to bandpass filtering, frequency translation, and amplification. In a frequency-division multiple-access application the hub transmitter sends a hub-terminal signal in frequency band F1 from hub terminal 100 on link 100A to satellite transponder 101. Satellite transponder 101 then relays back the filtered and amplified hub-terminal signal in frequency band F2 on downlink 101A to the receiver at the hub terminal 100 and also forwards the signal to receivers at each of the remote terminals 102. In full duplex operation uplink 102A is used by one or more of the remote terminals 102 to send transmit signals in frequency band F1. Those signals after frequency translation to frequency band F2 will be sent to the receiver at hub terminal 100 and they will suffer interference from the relayed hub-terminal signal that is in the same frequency band in downlink 101A. In order to reuse frequency band F2 with signals from remote terminals it is necessary to cancel the relayed hub-terminal signal by exploiting the available signal characteristics at the transmitter in hub terminal 100. The hub terminal 100 conventionally sends separate signals with a single carrier in a time-division multiplexed format to each of the remote terminals 102 so that the symbol rate for the hub-terminal signal is much larger than the symbol rate of a remote-terminal signal that is sent back to the hub terminal on a single carrier as part of a frequency-division multiplexed format. Also in this asymmetrical application a hub terminal generally employs a much larger diameter antenna than a remote terminal. As analyzed previously this symbol rate and antenna difference in this asymmetric satellite link results in interference power from the relayed hub-terminal signal that can be 53 dB larger than the remote received signal power at the hub terminal 100. This analysis also established that within the subband of the remote-terminal signal, the spectral density difference of the two signals can be as much as 30 dB and the maximum required cancellation of the relayed hub-terminal signal within that subband is about 45 dB for a degradation limit to the remote-terminal signal of 0.4 dB.

In the present invention, the availability of digital data associated with the hub-terminal signal at the receiver of hub terminal 100 is exploited to provide interference cancellation of its "self" interfering hub-terminal signal and reception of a signal from a remote terminal 102. This cancellation is limited by the presence of phase noise that is produced in radio-frequency (RF) frequency converters in the satellite link. In the satellite link the hub-terminal signal a(t), conveniently normalized to unit power, passes through a RF frequency converter and multiplicative phase noise results in the post-converter signal $$u(t) = a(t)e^{jp(t)} \quad (1)$$

The phase noise p(t) is a random noise that has a single-sided spectral density $S_p(f)$ relative to the unit normalized carrier power given, as an example, for a series connection of two Ku band frequency converters (one on the uplink and one on the downlink) as

| Frequency | dB | (2) |
|---|---|---|
| 1 | −24 | |
| 10 | −47 | |
| 100 | −69 | |
| 1000 | −76 | |
| 10000 | −86 | |
| 100000 | −95 | |
| 1000000 | −107 | |

Let s(t) be a remote-terminal signal, also conveniently normalized to unit power, that is modulated at an offset frequency $f_O$ and has a single-sided bandwidth $B_R$ that is much less than the hub-terminal signal single-sided bandwidth $B_H$. The remote-terminal signal is a bandpass signal as $f_O >> 2 B_R$ and it lies within the bandwidth of the hub-terminal signal as $f_O < B_H - B_R$. Let n(t) be a zero-mean complex-Gaussian noise with spectral density $N_0/P_H$ where $P_H$ is the average power in the received hub-terminal signal. A gain-normalized received signal within a bandwidth of $B_H$ Hz is then $$x(t) = \alpha a(t) e^{j\theta(t)+jp(t)} + \beta s(t) e^{j\omega_R t} + n(t) \quad (3)$$

The complex path gain α has been normalized to approximately unit magnitude by an automatic gain control (AGC) function and θ(t) represents channel phase variations with respect to the hub-terminal signal. As analyzed previously, the remote-terminal signal power can be 53 dB smaller than the relayed hub-terminal signal so the complex coefficient β can have a magnitude as small as 2.24E-03. Because the phase-noise term p(t) has power much less than unity, the exponential in the post-converter signal can be expanded by using the trigonometric identity and approximation $$e^{jp} = \cos(p) + j \sin p = 1 + jp, \quad |p| << 1 \quad (4)$$

It is clear from examination of Eqs. 3 and 4 that even with perfect cancellation of the relayed interference associated with the unity magnitude coefficient α, there remains a product of the relayed interference and the phase-noise signal p(t). A product in the time domain results in convolution of the power spectra in the frequency domain. Thus the phase-noise spectra in Eq. 2, above is spread over the much wider hub-terminal signal bandwidth $B_H$. Thus, in the remote-terminal signal subband, the effective spectral density due the uncancelled phase-noise component is approximately equal to the integrated power from Eq. 2. This value in a 100 kHz bandwidth is about −33 dB and with a required cancellation of −45 dB, an additional cancellation of the phase-noise component of about 12 dB is required to meet cancellation goals. In the present invention the subband signal demodulation of the remote terminal signal includes interference cancellation that estimates the phase-noise modulated carrier of Eq. 4 and uses it in place of an unmodulated carrier to provide an offset-constellation signal that includes the phase-noise variations. The offset-constellation signal is used in a subband equalizer to cancel the phase-noise modified relayed-interference in the received signal.

In the preferred embodiment of the invention the digital data associated with the hub-terminal signal is transferred to the receiver of hub terminal 100 to provide receiver-replica digital data that is used for interference cancellation of its "self" interfering hub-terminal signal and reception of a signal from a remote terminal 102. In an alternate embodiment the receiver-replica digital data is produced at the receiver of hub terminal 100 by demodulation of the hub terminal signal from the received signal. The use of receiver-replica digital data in the hub receiver to produce an interference signal has additional problems associated with interference signal cancellation that need to be addressed. Amplitude and/or timing components of the transmitted signal at the hub terminal can be disturbed by either an operator of the hub modulator doing minor maintenance or the hub modulator itself in the case of either automatic uplink power control compensating for rain fade or disruptions in the digital-data timing clock feeding the hub modulator from other equipment. Interference cancellation requires a precision adjustment of respective amplitudes and timing of the interference reference signal and the received signal.

With respect to amplitude there can be abrupt and significant (3 to 10 dB) changes in the received signal amplitude level due to transmit modem gain changes to compensate for rain attenuation. The normal amplitude variations in a satellite link are due to increased path loss from high moisture content in the atmosphere, e.g., a heavy rainstorm passing through the signal path. The water absorbs and scatters some of the microwave energy. In general the higher the frequency the larger is the attenuation. There are two common bands of frequencies used in satellite communications, C band and Ku band. C band is generally 3.4 GHz to 4.2 GHz for the receive path (from the satellite) and 5.85 GHz to 6.65 GHz for the transmit frequency (to the satellite). Ku band is generally 11.45 GHz to 12.75 GHz for the receive path and 14.0 GHz to 14.5 GHz for the transmit path. There are other frequencies but these are the most common. The expected amount of rain fade and the rate of fade vary with both relative satellite location and earth station location. Lower satellite angle and longer path through the atmosphere result in larger fades and fade rates. In general Ku band fades can be as large as 10 dB and the rate of change is typically less than 0.5 dB per second. C band values are significantly less. In a solution to this problem a feedback system, often called Automatic Uplink Power Control (AUPC), sends signal-to-noise data from the remote end back to the local end and adjusts the uplink transmit power to compensate for the attenuation. For multiple carriers in the transponder from a single local terminal, this approach is preferable to simply providing larger fade margin because it has the advantage that it statistically uses less power because only some of the carriers will be faded at any one time. The gain compensation change in an AUPC system is conventionally implemented in the modulator section of the local terminal transmitter.

With respect to timing the hub modulator symbol timing is often slaved to an incoming data source so any disturbances in digital-data rate timing caused by customers' equipment/network in the data path prior to the hub modulator will be followed by the hub modulator. For example if the customer switches the data source from one source to another anywhere up stream to the satellite terminal the digital-data clock phase/timing will make an abrupt change. That abrupt change will result in variations in the modulation symbol clock in the hub modulator as a result of timing tracking. If interference cancellation doesn't have foreknowledge of these variations in the modulation symbol clock, the subsequent tracking of these variations could momentarily result in suboptimal cancellation.

The changes in amplitude and timing can be incorporated into a replica of the hub transmit signal by transferring the intermediate frequency (IF) transmit signal at the hub modulator output to the hub receiver. Prior art systems such as the Collins '641 and '104 patents and the Avellan '877 patent disclose such a transfer of the IF transmit signal. However, such a transfer requires for large cancellation factors a high precision in the digitalization of the IF transmit signal resulting in a significantly larger bit transfer rate than the transfer of the digital data signal that generates the interference signal. Accordingly, the preferred embodiment in the present invention transfers the digital data signal plus amplitude and timing data so as to have both a lower bit transfer rate and protection against abrupt changes by exploiting the additional amplitude and timing information.

Figure 2:
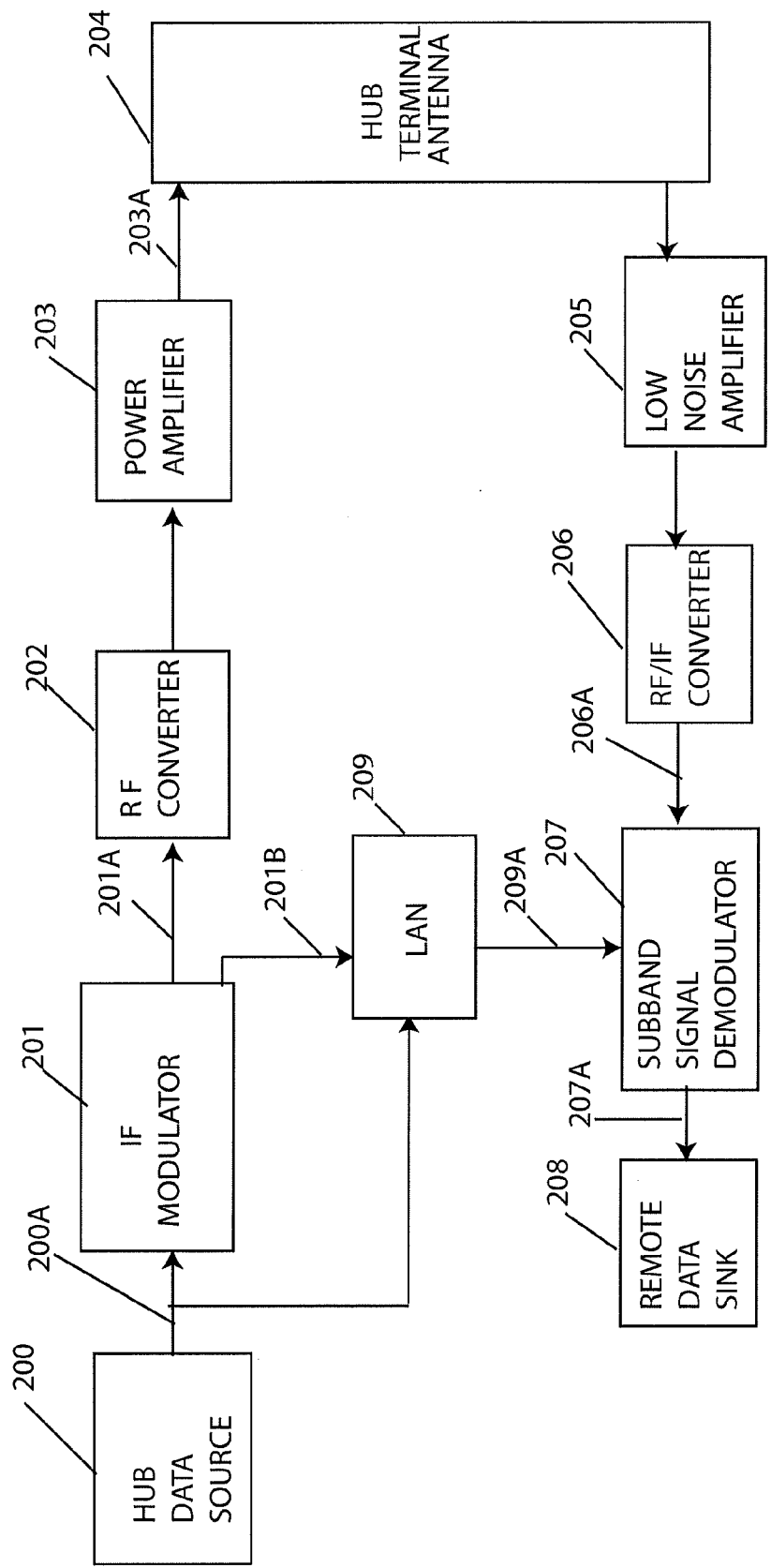
FIG. 2 is a block-diagram of the transmitter and receiver in the hub terminal of the satellite communication link of FIG. 1.

A block diagram of the transmitter/receiver in hub terminal 100 for the present invention is shown in FIG. 2. Hub data source 200 produces a hub digital-data signal 200A that in the preferred embodiment is provided directly to IF modulator 201 and via a wired Local Area Network 209 to subband signal demodulator 207 in the hub-terminal receiver. Hub data source 200 includes information digital data that may be augmented with redundancy for purposes of error detection and/or error correction. Subsequent error correction digital data from, for example, a convolutional encoder, may also be interleaved. Also reference data may be time-division multiplexed with the possibly coded and interleaved digital data to produce the hub digital data signal 200A. The IF modulator 201 converts the hub digital data signal 200A into a transmitted signal 201A at an intermediate frequency that is conventionally represented in complex notation.

The transmitted signal 201A has a set of constellation data values that forms a respective constellation alphabet in accordance with a type of modulation. The constellation alphabet is complex with either zero imaginary components for real modulation as in the case of Binary Phase-Shift Keying (BPSK) or generally complex for quadrature modulation techniques such as Quadrature Phase-Shift Keying (QPSK), M-ary PSK, and Quadrature Amplitude Modulation (M-QAM). As an example, some constellation alphabets, unit magnitude normalized, for common modulation techniques are given in Table 1.

TABLE 1

Example Constellation Alphabets

| Modulation | Alphabet |
|---|---|
| BPSK | $\pm 1 + j0$ |
| QPSK | $(\pm 1 \pm j)/\sqrt{2}$ |
| 8-PSK | $e^{jn\pi/4}$, n = 0, 1, 2, . . . , 7 |
| 16-QAM | $(\pm 1 \pm j)/\sqrt{2}$ |
|  | $(\pm 1 \pm j/3)/\sqrt{2}$ |
|  | $(\pm 1/3 \pm j)/\sqrt{2}$ |
|  | $(\pm 1/3 \pm j/3)/\sqrt{2}$ |

In general this invention includes any digital modulation technique that can be expressed by means of an alphabet with a finite set of complex numbers. Thus, the invention is also applicable to differentially encoded (DE) constellations alphabets such as DEQPSK.

In the IF modulator 201 there is a wideband symbol waveform filter that is used to meet spectral limitations for subsequent radio transmission. A symbol waveform corresponds to the filter impulse response. Consecutive constellation data values are applied in the form of an impulse train to the associated wideband symbol waveform filter to produce periodic constellation symbols. The period and symbol phase of the constellation symbols are determined by a constellation symbol clock. The transmitted signal 201A then consists of the intermediate frequency conversion of a train of consecutive symbol waveforms that overlap each other and each wideband symbol waveform in the train has an associated constellation data value from the respective constellation. Accordingly, the transmitted signal 201A has a bandwidth (bandwidth whether at baseband or in a band-pass realization is defined herein as one-sided) of approximately $B_H = (1+r_H) R_H/2$ Hz where $r_H$ is the wideband symbol waveform filter roll-off parameter, $0 < r_H \le 1$, and $R_H$ is the symbol rate for the constellation alphabet in the hub-terminal signal. The transmitted signal 201A at the hub terminal is an information-bearing signal with respect to destination remote terminals. At the hub terminal the transmit signal 201A is an interference signal that is relayed by the satellite transponder producing the relayed-interference in the hub-terminal received signal.

The transmitted signal 201A at the output of IF modulator 202 is converted to a radio frequency (RF) by RF converter 202 and then amplified for transmission by power amplifier 203. The resulting hub-terminal signal 203A is then transmitted by hub-terminal antenna 204 via the satellite transponder 101 of FIG. 1 toward the remote terminals 102. In the preferred embodiment the hub digital data signal 200A and a magnitude measure of the transmitted signal 201A are passed to subband signal demodulator 207 via link 201B. In the present invention link 201B is connected to a wired Local Area Network (LAN) 209 to be described subsequently. The digital transmitted-signal magnitude measure is used in subband signal demodulator 207 to compensate for hub modulator gain changes due to operator maintenance or rain attenuation variations. The transmitted signal 201A includes constellation symbols that are produced by a constellation-symbol clock. A symbol-timing measure including phase and frequency variations of this clock due to disturbances in digital-data rate timing caused by customers' equipment/network in the data path prior to the hub modulator is also passed to subband signal demodulator 207 via link 201B. The symbol-timing measure is used in subband signal demodulator 207 to absorb customer-related timing changes in a wideband timing phase-locked loop that tracks variations in the symbol clock of the relayed-interference caused by changes in path delay between a terminal and the satellite due to satellite motion.

In the preferred embodiment the transfer of the hub digital data signal and magnitude and symbol timing measures from the transmitter to the receiver at the hub terminal are accomplished with a wired Local Area Network (LAN) 209. For this wired LAN distribution using, for example, an Ethernet wired LAN, the hub-terminal transmitter has a Gigabit Ethernet interface assembly that transmits Ethernet packets using broadcast address mode. Broadcast address mode causes the packets to be sent out all ports of an Ethernet switch that will be used for data distribution instead of just the switch port that is connected to a specific end address. The subband signal demodulators in hub-terminal receivers accept broadcast address packets without having to be specifically addressed. The packets contain a packet count byte that increments with each new packet sent so the subband signal demodulator can easily determine if a packet is lost or it received a redundant packet. A numerical bit example would send 32 bits of digital-data bits (eight 16QAM 4 bit constellation symbols down to eight BPSK 1 bit constellation symbols). The 8 constellation symbols per 32 bits remain constant regardless of modulation type. These 32 bits would be followed by 16 bits of the magnitude measure followed by 16 bits of the symbol-timing measure. The resulting 64-bit block structure is repeated until the Ethernet packet is filled. The hub terminal receivers have a Gigabit Ethernet interface that receives these broadcast address packets and feed them to a buffer in the subband signal demodulator in proper order.

In an example system with a maximum constellation-symbol rate of 14.76E+6 symbols per second and a maximum constellation alphabet of 16QAM (four bits/symbol) the transfer bit rate is 118.08 Mbps for the above scheme where one-half the transfer bits are allocated to the digital-data signal transfer (4×14.76=59.04 Mb/s) and the other half is dedicated to the transfer of amplitude (29.52 Mb/s) and timing information (29.52 Mb/s). In contrast some prior art systems transfer the transmit IF signal. As an example of the extra complexity of digitizing the transmit IF signal, the Avellan '877 patent describes an analog to digital converter operating at a 105 Msps and with a typical 12 bit wide bit conversion, the serial rate is 1.26 Gbps or 10.7 times greater than the Ethernet distribution system. Additionally the latter system covers an IF range from 50 to 180 MHz whereas the '877 patent discloses a 70 MHz system that is only 36 MHz wide.

Besides the less complexity and cost associated with a lower bit transfer rate the use of the Ethernet distribution of digital data and amplitude/timing information has the further advantage of readily available low cost equipment to distribute the data to as few as a couple of hub demodulators to potentially hundreds of them. This Ethernet distribution is also already FCC (and others) approved for radiated RF noise and it also has various approvals for safety and RoHS standards.

The remote terminal 102 generates remote-terminal digital-data values that will be transmitted in a subband of the frequency band used by the hub-terminal signal and will be subsequently detected at the hub terminal receiver. The remote-terminal digital data is conventionally constellation modulated, filtered with a subband symbol waveform filter, and frequency converted to a subband location in the hub-terminal signal frequency band to produce a subband signal. The subband symbol waveform filter produces a signal that has a subband-signal bandwidth $B_R$ of approximately $(1+r_R)R_R/2$ Hz where $r_R$ is the subband symbol waveform filter roll-off parameter, $0 < r_R \leq 1$, and $R_R$ is the subband symbol rate of the constellation data. In this asymmetric satellite application the hub terminal typically uses time-division multiplex to send separate signals to each of the remote terminals. The remote terminals conventionally use frequency-division multiple access to send a lower data rate signal back to the hub terminal using a subband of the hub terminal signal frequency band. Accordingly, the remote-terminal subband symbol rate $R_R$ is typically much less than the hub-terminal symbol rate $R_H$. The goal of the receiver in FIG. 2 is to detect the remote-terminal digital data from a received signal that contains both a modified version of the subband signal and interference from the relayed hub-terminal signal.

The received signal on the satellite transponder downlink 101A includes a frequency translated and amplified version of the hub-terminal signal 203A and one or more remote-terminal subband signals that have transited satellite transponder 101. The hub-transmit signal 203A has transited uplink 100A, the satellite transponder 101, and downlink 101A to the receiver at terminal 100. A remote terminal subband signal has transited uplink 102A, satellite transponder 101, and downlink 101A to the receiver at terminal 100.

Because of the differences in the two uplinks, frequency and delay errors will not be the same in the modified version of the hub-terminal signal and the remote-terminal subband signal component of the received signal. Additionally both these signals may under go filtering effects due to group delay in satellite transponder 101, RF converter 202, and RF/IF converters 206.

Figure 3:
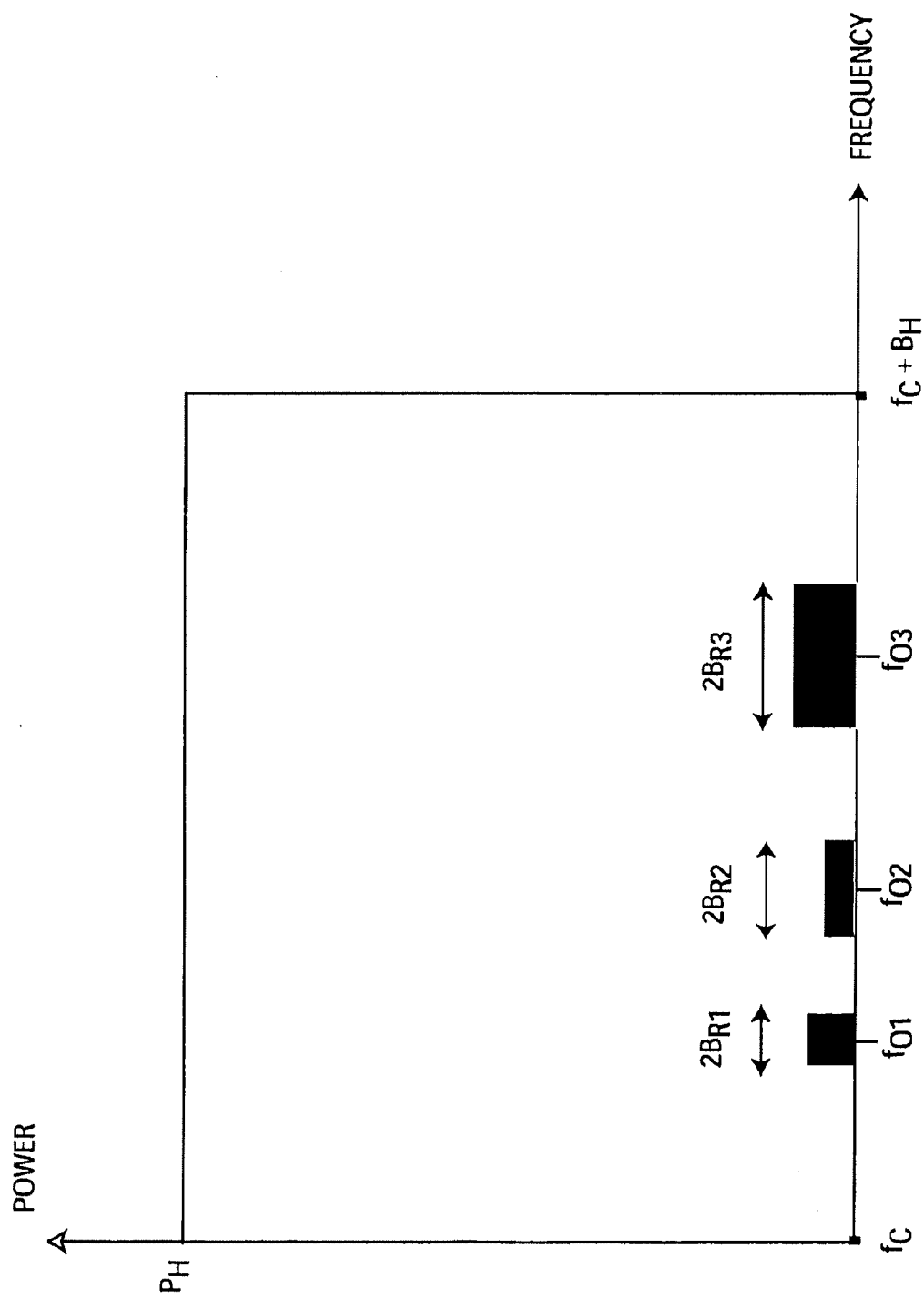
FIG. 3 is a graph of hub and remote received signal power spectra as a function of frequency at the hub terminal antenna of FIG. 2.

As an example of frequency allocations in this asymmetrical satellite configuration, FIG. 3 illustrates the upper sideband of the received power spectra for the relayed hub-terminal signal and three remote-terminal subband signals. For a carrier frequency of $f_C$ the hub-terminal signal spectrum has a bandwidth of $B_H$ and a power spectral density level $P_H$. Since the remote terminal conventionally transmits at a much lower data rate than the hub terminal, each of the remote terminal subband-signal bandwidths $B_{R_j}, j=1, 2, 3$ are generally much less than the hub-terminal signal bandwidth $B_H$ and are frequency-division multiplexed within the hub-terminal signal at offset frequencies $f_{Oj}, j=1, 2, 3$ to the carrier frequency $f_C$. As shown in FIG. 3 the occupied band for each remote-terminal subband signal is twice its baseband bandwidth $B_R$. The received power spectrum of FIG. 3 does not illustrate the additional offset error frequencies $f_{OEj}, j=1, 2, 3$ due to remote terminal frequency error that adds to the offset frequencies $f_{Oj}, j=1, 2, 3$. The power spectral density levels in FIG. 3 are also illustrative and not to scale because, as discussed previously, the remote-terminal signal power spectral density level at hub-terminal antenna 204 can be three orders of magnitude smaller than the relayed hub-terminal signal power spectral density level $P_H$.

Returning to FIG. 2 the received signal at hub-terminal antenna 204 is provided to low-noise amplifier 205 and then converted to an intermediate frequency (IF) by RF/IF converter 206. In the present invention the output of RF/IF converter, received IF signal 206A, is provided to a plurality of subband signal demodulators 207, one for each of the remote terminal signals that require interference cancellation. Accordingly, the terminal intermediate frequency is common to all of the subband signal demodulators. Because of the large levels of required interference cancellation, digital baseband processing with its associated precision is used. Accordingly, the output of the subband signal demodulator with cancelled relayed hub-terminal signal interference is a digital-data signal corresponding to detected values of the remote-terminal transmitted digital data values. These detected values are passed to data sink 208 which may include additional digital data operations such as deinterleaving and error-correction decoding. In the preferred embodiment cancellation of the relayed hub-terminal signal interference is made possible by transferring the hub digital-data signal 200A to the subband signal demodulator 207. It is advantageous in a satellite communication station to minimize the number of bits required to physically transfer signals. Accordingly, it is preferable to transfer the hub digital data signal rather than the transmitted signal 201A. Since the present invention utilizes a separate subband signal demodulator 207 for each desired remote terminal signal, the cancellation of the relayed hub-terminal signal can be focused on the smaller bandwidth of the desired remote terminal signal resulting in a larger cancellation factor.

Figure 4:
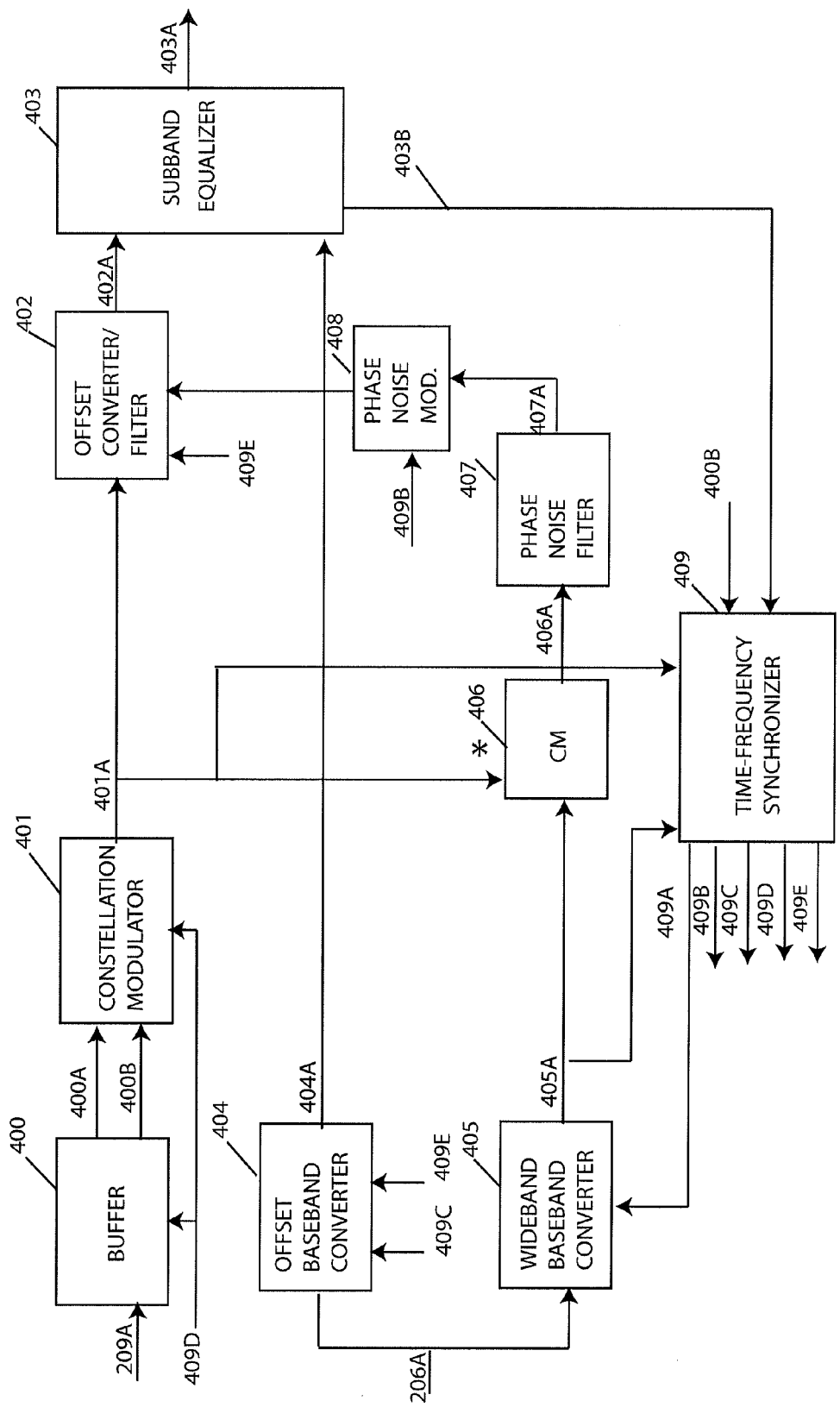
FIG. 4 is a block-diagram of the subband signal demodulator of FIG. 2.

A block diagram of the subband signal demodulator 207 is shown if FIG. 4. In the preferred embodiment the hub digital data signal, a magnitude measure of the transmitted signal, and a symbol-timing measure from the hub transmitter are provided by the wired LAN 209 via link 209A to buffer 400 where the receiver-replica digital data and signal measures are delayed and stored. In an alternate embodiment receiver-replica digital data is produced from demodulation of the received IF signal 206A. Buffer 400 outputs a delayed digital-data signal 400A that is provided to constellation modulator 401 to be described subsequently. Buffer 400 also outputs via 400B a delayed magnitude measure and a delayed symbol-timing measure that are provided to constellation modulator 401. The delayed magnitude measure is used to adjust the amplitude of constellation signal 401A at the output of constellation modulator 401. The delayed symbol-timing measure is also provided to time-frequency synchronizer 409 where it is used in the wideband timing phase-locked loop to be discussed subsequently. The digital-data signal, magnitude measure, and symbol-timing measure are delayed in buffer 400 by the same time-delay parameter. The time-delay parameter is computed in the time-frequency synchronizer 409 to be described subsequently.

The constellation signal 401A produced by constellation modulator 401 operating on the delayed digital-data signal 400A from buffer 400 contains the digital-data values in the modulation constellation alphabet and corresponds to a baseband receiver version of the transmitted signal 201A. The constellation signal 401A is sampled by a constellation clock at a sample rate $1/T_H$, where $T_H$ is the constellation-sample period. The sample rate is a multiple $q_H \geq 2$ of the nominal hub transmitted signal symbol rate $R_H$ to provide a coarse time delay resolution of $1/q_H R_H$ seconds. The delay resolution is much finer than the discrete sample points. The generation of 401A is accomplished with the wideband timing phase-locked loop that has fractional phase information that is used to interpolate the fixed rate sample points with fine resolution. Or in other words, the sampled waveform can be moved in time in fine steps relative to the fixed sample points. The constellation signal 401A has the previously defined constellation bandwidth $B_H = (1+r_H) R_H/2$ Hz so that from Nyquist theory a minimum value for $q_H$ is $1+r_H$. The constellation signal 401A is provided to offset converter/filter 402 that frequency-shifts the constellation signal by a shift signal corresponding to a constellation converter frequency 409B and subsequently match filters the frequency-shifted constellation signal with the subband symbol waveform to produce a narrowband offset-constellation signal 402A that is provided to subband equalizer 403.

The received IF signal 206A includes the relayed hub-terminal signal interference that has a center frequency equal to the sum of a carrier frequency $f_C$ that is nominally, but not exactly, the same as the terminal IF set by RF/IF converter 206 and a carrier error frequency $\hat{f}_{CE}$. A carrier error frequency estimate $f_{CE}$ is generated in time-frequency synchronizer 409. For wideband synchronization purposes and for compensation of frequency-converter phase noise, a conversion to baseband of received IF signal 206A produces a wideband received signal 405A at the output of wideband baseband-converter 405. This conversion uses a wideband converter frequency 409A that in a preferred embodiment is equal to $$f_{WC} = f_C + f_{CE}. \tag{5a}$$

where the carrier frequency is a locally generated oscillator frequency $f_C$ and the carrier error frequency estimate $f_{CE}$ is generated in time-frequency synchronizer 409. The received IF signal 206A also includes the remote-terminal subband signal that has a subband carrier frequency that is equal to the carrier frequency plus the offset frequency plus an offset error frequency. A local oscillator in time-frequency synchronizer 409 generates the offset frequency $f_O$. An offset error frequency estimate $f_{OE}$ is also generated in time-frequency synchronizer 409. Subband equalizer 403 operates at baseband in a shifted-subband corresponding to the remote-terminal signal subband. Cancellation in subband equalizer 403 of the relayed interference requires frequency alignment of the narrowband offset-converted constellation signal 402A and the relayed interference component in the received signal. In a preferred embodiment the constellation converter frequency $f_{CC}$ provided on link 409B is selected as the carrier error frequency estimate minus the sum of the offset frequency and the offset error frequency, i.e.

$$f_{CC} = f_{CE} - f_O - f_{OE}. \tag{5b}$$

As will be shown subsequently relative to the offset baseband conversion for the subband signal component, this selection makes the equalizer operation independent of the tracking of the offset error frequency and provides perfect frequency alignment of the offset-converted constellation signal and the relayed interference component in the received signal when the carrier error frequency estimate is equal to the carrier error frequency. For reduction of satellite link frequency-converter phase noise effects, the offset frequency conversion of constellation signal 401A in offset converter/filter 402 is accomplished with a shift signal that includes phase modulation of the constellation converter frequency by a phase-noise error signal. The generation of the phase-noise error signal, described in more detail below, is accomplished by digitally demodulating the received IF signal 206A and using the constellation signal 401A to strip off the phase component of the relayed-interference digital modulation.

Since the cancellation of the subband component of the relayed hub-terminal signal in the present invention occurs at baseband, an offset baseband-converter 404 converts the received IF signal 206A with a offset converter frequency provided on link 409C to a narrowband-received signal 404A corresponding to the subband component of the relayed hub-terminal interference and the remote-terminal subband signal. The product of the received IF signal 206A and the offset converter frequency 409C results in an offset-received signal. Optimum demodulation with respect to additive Gaussian noise in this conversion is achieved by signal-component matched filtering the offset-received signal with a filter that has an impulse response that is equal to the complex-conjugate and time-inverted impulse response of the subband symbol waveform to produce the narrowband-received signal 404A. This conversion requires sufficient dynamic range in order to capture the remote-terminal subband signal in the presence of the large relayed hub-terminal interference. Use of the subband symbol waveform filter, in addition to providing optimum demodulation, reduces dynamic range requirements. To further reduce dynamic range requirements, the analog to digital conversion occurs after prefiltering by an analog prefilter. After digital conversion a digital filter is used to complete the signal-component matched filtering. The combination of the analog prefilter and the post-conversion digital filter has an impulse response equal to the complex conjugate and time-inverted impulse response of the subband symbol waveform.

In the digital conversion the digital outputs are clocked with a subband symbol clock provided on link 409E that is tracking the frequency and phase of the remote-terminal subband symbol rate $R_R$ used for constellation modulation.

In a preferred embodiment the offset converter frequency $f_{OC}$ provided on link 409C is set equal to the carrier frequency plus the offset frequency plus the offset error frequency estimate, i.e., $$f_{OC} = f_C + f_O + f_{OE}. \tag{5c}$$

Figure 5:
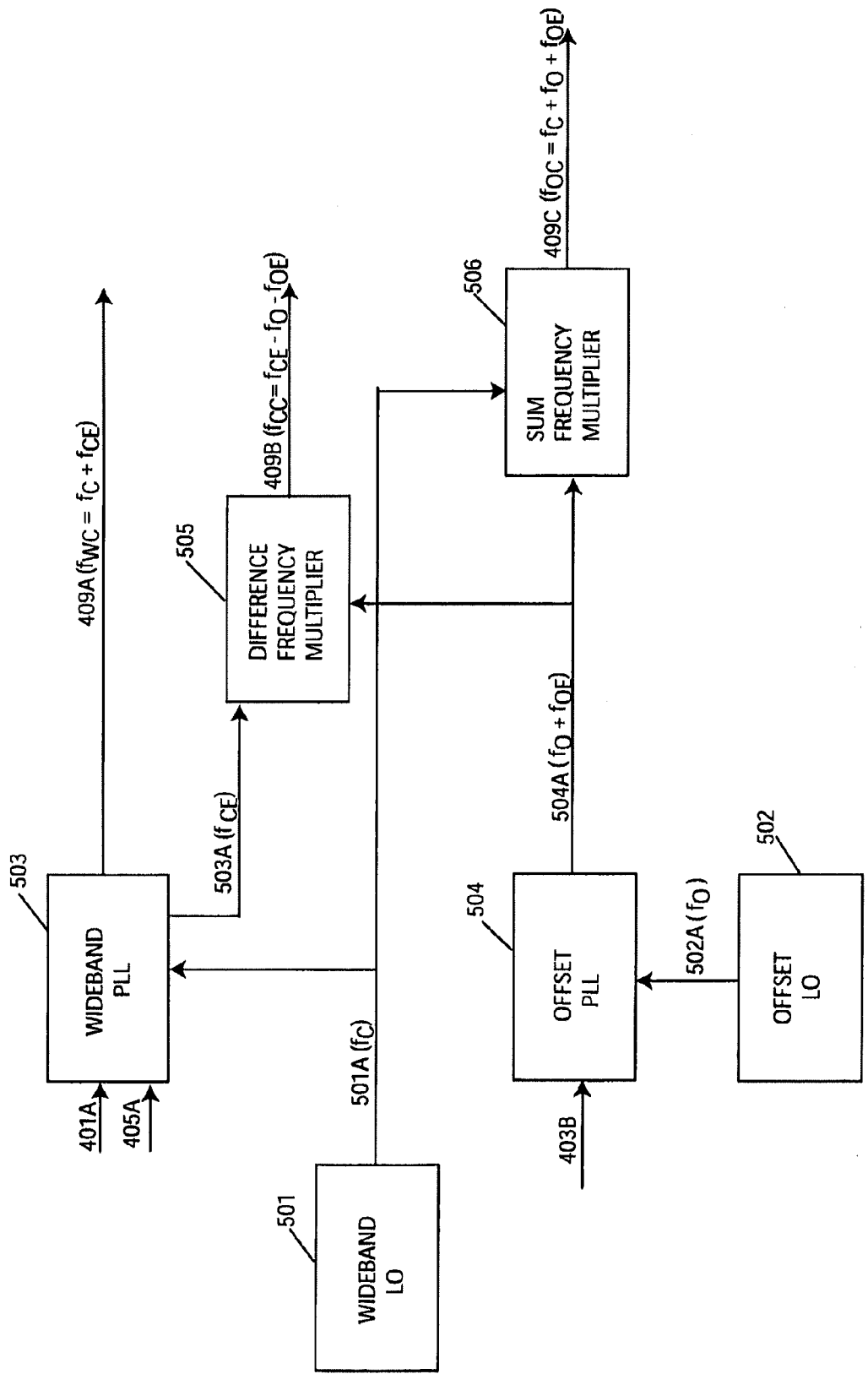
FIG. 5 is a block diagram of the generation of converter frequencies in the time-frequency synchronizer of the subband signal demodulator of FIG. 4.

The generation of the wideband converter frequency 409A ($f_{WC}$), offset converter frequency 409C ($f_{OC}$), and constellation converter frequency 409B ($f_{CC}$) with phase-locked loops used in time-frequency synchronizer 409 is illustrated in FIG. 5. Wideband local oscillator (LO) 501 generates the nominal carrier frequency $f_C$ and offset LO 502 generates the nominal offset frequency $f_O$. These oscillator frequencies are provided to respective phase-locked loops (PLL) that include an error frequency input. The wideband PLL 503 generates from constellation signal 401A and wideband-received signal 405A a frequency error equal to the carrier error frequency estimate $\hat{f}_{CE}$. This frequency error is provided on link 503A to the difference frequency multiplier 505. The output of wideband PLL 503 is at the wideband converter frequency 409A ($f_C + \hat{f}_{CE}$). The offset PLL 504 generates from the demodulated subband signal 403B a frequency error equal to the offset error frequency estimate $\hat{f}_{OE}$. The output of offset PLL 504 is the corrected offset frequency ($f_O + \hat{f}_{OE}$) that is provided on link 504A to difference frequency multiplier 505 and sum frequency multiplier 506. Difference frequency multiplier generates the constellation converter frequency on link 409B that is the difference (Eq. 5b) of the carrier frequency error estimate and the corrected offset frequency. Sum frequency multiplier 506 generates the offset converter frequency on link 409C that is the sum (Eq. 5c) of the carrier frequency and the corrected offset frequency given by Eq. (5c). After frequency conversion of the constellation signal 401A by the constellation converter frequency $f_{CC}$ the resulting subband component corresponds to relayed interference centered at $f_{CC}$. With the carrier error frequency $\hat{f}_{CE}$, the resulting subband component of the relayed interference from the received signal after offset conversion by the offset converter frequency $f_{OC}$ is centered at $f_C + \hat{f}_{CE} - f_{OC}$. The equalizer frequency error (EFE) for cancellation of the relayed interference in the equalizer is then equal to $$\text{EFE} = f_C + \hat{f}_{CE} - f_{OC} - f_{CC} = \hat{f}_{CE} - f_{CE} \quad (6)$$

which is zero when the carrier error estimate is equal to the carrier error frequency. The selection of converter frequencies in Eq. 5a-c, above, has the result that inaccuracies in the offset error frequency estimate $\hat{f}_{OE}$ does not affect wideband cancellation in subband equalizer 403 as the $f_{OE}$ term cancels out in the equalizer EFE of Eq. 6. Defining the offset error frequency as $\hat{f}_{OE}$, the demodulated subband signal has a subband frequency error (SFE) equal to $$\text{SFE} = f_C + f_O + \hat{f}_{OE} - f_{OC} = \hat{f}_{OE} - f_{OE} \quad (7)$$

which is zero when the offset error estimate is equal to the offset error frequency.

Subband equalizer 403 includes a complex equalizer weight that multiplies the narrowband offset-constellation signal 402A to provide a gain, phase, and frequency adjustment for subsequent interference cancellation of the subband component of the relayed hub-terminal signal. The product of the complex equalizer weight and the narrowband offset-constellation signal 402A is a narrowband equalized signal corresponding to the subband component of the relayed hub-terminal interference signal. This narrowband equalized signal and narrowband-received signal 404A are combined in subband equalizer 403 to produce the demodulated subband signal 403B with reduced relayed interference from the hub terminal. Conventional constellation detection of the demodulated subband signal 403B produces the remote-terminal detected digital data signal 403A.

The wideband conversion of the received signal to produce the wideband received signal 405A requires enough signal dynamic range to result in a subsequent phase-noise estimate with enough precision to be used to realize additional cancellation. Time-frequency synchronizer 409 uses correlation operations and wideband phase-locked loop tracking to provide the wideband converter frequency 409A and digital data time delay and constellation clock provided on link 409D. These wideband synchronization parameters are generated from the constellation signal 401A, the delayed symbol-timing measure included in buffer 400 output 400B, and the wideband received signal 405A. In a preliminary analysis herein the hub-remote asymmetrical satellite configuration was shown to produce at the hub receiver an interference signal with spectral density larger than the remote signal spectral density by as much as 30 dB. Since the spectral density of the additive noise is on the order of 5 dB less than the remote-terminal signal spectral density, this analysis shows that, despite the large cancellation factor required, the wideband synchronization with respect to the relayed-interference signal will occur in a weak noise environment so that frequency and time synchronization parameters can be easily acquired and, subsequently during subband equalizer 403 operation, tracked with acceptably small error.

Wideband synchronization with respect to the relayed interference signal includes acquisition and tracking of symbol timing and carrier parameters. Acquisition of initial synchronization parameters occurs before cancellation of relayed interference occurs in subband equalizer 403. Acquisition techniques in weak noise environments are known to one of ordinary skill in the art. Examples of conventional frequency and time acquisition techniques can be found in Jack K. Holmes, "Coherent Spread Spectrum Systems", Wiley-Interscience, New York, 1982. One such conventional technique is accomplished in the following order: (1) carrier frequency acquisition, (2) wideband symbol timing acquisition, and (3) frame synchronization. The carrier frequency acquisition can be realized by sweeping the wideband converter frequency 409A until it passes through the wideband carrier center frequency where the feedback in a suppressed carrier tracking loop overcomes the sweep signal and phase locks onto the received IF signal 206A. A suppressed carrier loop operates to extract the carrier phase and frequency from a received signal that contains all the signal energy in the data modulation so that there is no carrier component. A suppressed carrier loop employs a nonlinearity that is specific to the constellation alphabet so as to produce a carrier component that the loop can lock to. A suppressed-carrier tracking loop in the present invention includes wideband signal demodulation of wideband received signal 405A in time-frequency synchronizer 409 to produce demodulated constellation samples. In the wideband signal demodulation the wideband received signal 405A is provided to a matched filter equal to the complex-conjugate time-inverted impulse response of the wideband symbol waveform filter. The matched-filtered output are demodulated constellation samples that are generated from a wideband symbol clock that is nominally equal to the hub-terminal constellation symbol rate $R_H$ times an oversampling factor. At this point in the acquisition the demodulated constellation samples contain intersymbol interference errors because acquisition of the wideband symbol clock is performed subsequently to the carrier acquisition. A common technique to implement a suppressed-carrier tracking loop is a Costas loop. A Costas loop can be used to acquire carrier frequency and phase for a wide range of suppressed carrier constellation formats (any form of PSK, APSK and QAM among others) by using nonlinear operations on in-phase and quadrature components and the appropriate phase detector for the specific constellation format being used. See Jack K. Holmes, Coherent Spread Spectrum Systems, Wiley-Interscience, New York, 1982, Chapter 5. Acquisition of the wideband symbol clock after carrier frequency and phase error have been removed can be accomplished by detecting digital modulation transitions in the demodulated constellation samples and providing the resulting transition signal that includes symbol frequency and symbol phase error to a symbol-acquiring phase locked loop whose output is the wideband symbol clock. See Jack K. Holmes, Coherent Spread Spectrum Systems, Wiley-Interscience, New York, 1982, Chapter 12.

In the alternate embodiment receiver-replica digital data is produced from the subset of demodulated constellation samples at the nominal constellation symbol rate by detecting the corresponding symbol value in the constellation alphabet and converting the symbol value into receiver-replica bit values. In this embodiment the receiver-replica digital data is then provided to buffer 400 as opposed to the digital data provided by the wired LAN 209. The receiver-replica digital data is delayed in buffer 400 and applied to constellation modulator 401 to produce the constellation signal 401A that contains in this embodiment the detected digital-data values in the modulation constellation alphabet. In both embodiments the time-delay in buffer 400 is adjusted for proper alignment with the relayed interference in narrowband offset-constellation signal 402A such that effective cancellation in subband equalizer 403 will result. In this embodiment an additional fixed delay is inserted in offset baseband converter 404 to compensate for the delay in the detection of the digital data from the demodulated constellation samples.

After carrier frequency and wideband symbol timing acquisition an initial alignment of the time delay in buffer 400 is established. The matched filtering using the complex-conjugate time-inverted impulse response of the wideband symbol waveform filter described above with respect to the wideband received signal 405A is also applied to the constellation signal 401A in time-frequency synchronizer 409 to produce matched-filter constellation samples. These samples are at the nominal symbol rate $R_H$ for the constellation alphabet in the hub-terminal signal. Frame synchronization, i.e. finding the correct delay time alignment in constellation symbol increments in order to set an initial delay in buffer 400, is then accomplished as follows. The time-delay parameter included in connection 409D provided to buffer 400 is initially set to just under the minimum expected satellite delay time. One then increments the symbol delay buffer one symbol at a time until a match is obtained in time-frequency synchronizer 409 between the demodulated constellation samples and the matched-filter constellation samples. Because during frame acquisition there is a possible phase lock ambiguity error due to the suppressed-carrier tracking loop using wideband received signal 405A, the various possible lock ambiguities for the specific constellation modulation type must be considered while making the symbol comparisons. Once the symbol frame alignment is found the lock ambiguity can be corrected resulting in precise wideband carrier phase alignment.

After initial wideband carrier frequency, wideband symbol timing acquisition, and frame synchronization, multiplication of constellation signal 401A with the wideband received signal 405A generates a carrier error frequency estimate $f_{CE}$ in a carrier phase-locked loop (CPLL). The CPLL tracks variations in the carrier error frequenc $\hat{f}_{CE}$. In a preferred embodiment the wideband converter frequency provided to wideband baseband converter 405 on link 409A is the sum of the nominal carrier frequency $f_C$ and the carrier error frequency estimate $f_{CE}$. Because of the adaptation of subband equalizer 403, if the carrier frequency estimate in the constellation converter frequency of Eq. (5b) is not equal to the carrier frequency error, i.e., the equalizer frequency error EFE of Eq. (6) is not zero, the subband equalizer weight will oscillate at EFE Hz (if this value is within the equalizer loop bandwidth) to remove the frequency error to preclude degrading the relayed interference cancellation. To avoid cancellation degradation associated with the weight adaptation, described subsequently with respect to FIG. 6, in subband equalizer 403, the loop bandwidth for the CPLL should be set significantly smaller than the equalizer loop bandwidth.

Because the adaptation of subband equalizer 403 occurs in a generally much smaller bandwidth than the relayed interference bandwidth, multiple subband equalizer taps do not provide appropriate delay compensation of constellation signal 401A necessary for large cancellation factors. Accordingly, after initial acquisition, precise tracking with respect to the relayed interference of the constellation symbol clock 409D used in constellation modulator 401 is essential to maintain relayed-interference cancellation levels in subband equalizer 403. This precise tracking is accomplished in a timing phase-locked loop (TPLL) using the constellation signal 401A and the wideband received signal 405A. Denoting the in-phase (I) and quadrature (Q) constellation signal samples as $C_I$ and $C_Q$, respectively, and the I and Q components of the wideband received signal 405A samples as $R_I$ and $R_Q$, respectively, the sample-timing error signal for tracking by the TPLL is $$E_{TPLL} = \Delta C_I(R_I - C_I) + \Delta C_Q(R_Q - C_Q) \tag{8}$$

where the $\Delta$ operation denotes the difference in successive sample periods and this difference corresponds to time differentiation. The delayed symbol-timing measure provided from buffer 400 via 400B to time-frequency synchronizer 409 is used in the TPLL to absorb customer-related timing changes by being summed with the TPLL sample-timing error signal of Eq. 8. In the alternate embodiment during the tracking mode described above the wideband symbol clock used to generate the demodulated constellation samples and subsequently the detected digital data is locked to the constellation clock.

In addition to tracking delay variations in the relayed interference that are due to the satellite channel and its components, delay compensation is also required for variations in circuit delay due to temperature and time. These variations result in unequal respective delays through the offset converter filter 402 and the offset baseband converter 404 causing uncorrected delay errors between the subband equalizer 403 input signals 402A and 404A. A variable fine delay feedback loop is used to compensate for these circuit delay differences. In time-frequency synchronizer 409 the mechanism that keeps the time alignment centered in subband equalizer 403 is a variable fine delay that adjusts an interpolating time-delay filter in offset converter/filter 402. This variable fine delay is controlled by a feedback loop operating on the I and Q components of the constellation signal 401A and the demodulated subband signal 403B to maintain optimum time alignment. Again, denoting the I and Q components of the constellation signal samples as $C_I$ and $C_Q$, respectively, and denoting the I and Q components of the demodulated subband signals from the subband equalizer 403 as $D_I$ and $D_Q$, respectively, the delay-feedback-loop error signal is $$E_{DFL} = \Delta C_I(D_I) + \Delta C_Q(D_Q) \tag{9}$$

where again, the $\Delta$ operation denotes the difference in successive samples. The delay feedback loop includes an FIR interpolating low-pass filter combined with a variable delay buffer in offset converter/filter 402 that steps in sample period steps that are small compared to the subband equalizer 403 sampling period. In the alternate embodiment this circuit delay compensation includes the effects of additional delay that is inserted in offset baseband converter 404 to compensate for the delay in the detection of the digital data from the demodulated constellation samples.

Narrowband synchronization includes producing the offset error frequency estimate $f_{OE}$ and a subband symbol timing parameter that determines the phase and frequency of subband symbol clock 409E. The offset error frequency estimate, as described above, is a component in the offset converter frequency 409C and the constellation converter frequency 409B. The subband symbol clock 409E is used in offset baseband converter 404 and in offset converter/filter 402 to sample the output of the signal-component matched filter at a symbol time corresponding to the remote-terminal subband symbol rate clock. Narrowband acquisition of the offset error frequency and subband symbol timing uses the demodulated subband signal 403B with conventional techniques such as described above with respect to the wideband signal acquisition but with additional averaging reflecting the generally smaller signal-to-noise ratio. In particular, the offset frequency acquisition can be accomplished by sweeping the offset converter frequency 409C in conjunction with a suppressed subband carrier tracking loop realized as a Costas loop operating on the in-phase and quadrature components of demodulated subband signal 403B. This suppressed subband carrier tracking loop is also used for tracking after lock is detected at a particular frequency sweep value. Symbol timing acquisition and tracking from the demodulated subband signal 403B after the offset frequency acquisition described above can be accomplished by detecting digital modulation transitions and providing the transition signal that includes symbol frequency and symbol phase error to a subband symbol-tracking phase locked loop. The selection of converter frequencies in Eq. 5a-c, above, allows the narrowband acquisition and subsequent tracking processes to manipulate the offset error frequency estimate as needed without disturbing the relayed interference cancellation level. The subband symbol acquisition and tracking also does not affect the relayed interference cancellation level.

For reduction of satellite link frequency-converter phase noise effects, the offset frequency conversion of constellation signal 401A in offset converter/filter 402 is accomplished with a shift signal that includes phase modulation of the constellation converter frequency by a phase-noise error signal. In order to generate a phase-noise signal estimate from the constellation signal 401A and the wideband received signal 405A, it is desirable to isolate the phase-noise component of interest by, first, removing the phase component of the digital modulation in wideband received signal 405A and, second, reducing the effects of multiple remote-terminal signals and channel noise in wideband received signal 405A by filtering to an appropriate phase-noise bandwidth. That phase-noise bandwidth should be optimized for phase noise cancellation in the presence of remote terminal interference. Because the phase noise spectrum falls off with frequency as shown in Eq. (2), this optimization leads to a phase-noise bandwidth at least as large as the subband symbol waveform filter bandwidth used in offset baseband converter 404 and offset converter/filter 402 for smaller remote-signal bandwidths but smaller than the subband symbol waveform filter bandwidth for larger remote-signal bandwidths. For example, for a smaller remote-signal bandwidths of 100 kHz, and at a phase-noise bandwidth of 100 kHz, the numerical integration of Eq. (2) calculated previously results in a phase-noise signal component with power that is −33 dB relative to a unit-normalized carrier and, thus, requires full cancellation across the 100 kHz bandwidth.

In FIG. 4 constellation signal 401A multiplies the wideband received signal 405A in complex multiplier 406 eliminating the phase component of the digital modulation. After complex multiplication in unit 406 the phase-noise estimate 406A effectively contains multiple spread remote-terminal signals and additive channel noise. Returning to Eq. 3, this equation represents the wideband received signal 405A after time and frequency synchronization. Because of the synchronization, the amplitude coefficient α is approximately unity and the phase term θ is approximately constant. The constellation signal 401A for the synchronized condition is a(t). The product of the complex conjugate of the constellation signal 401A and the wideband received signal 405A results in the phase-noise estimate 406A:

$$y(t) = |a(t)|^2 e^{jp(t)+j\theta} + \beta a^*(t)s(t)e^{j\omega_R t} + \hat{n}(t) \qquad (10)$$

where $\hat{n}(t)$ is the modified additive noise after multiplying the channel additive noise by the constellation signal 401A. The phase-noise estimate Eq. (10) is an estimate of the phase-noise modulated carrier of Eq. 4. This estimate is then low-pass filtered and unit magnitude converted in phase-noise filter 407 to provide the phase-noise error signal 407A.

The magnitude squared coefficient on the first term in Eq. (10) is an amplitude variation associated with the constellation symbol rate that is effectively eliminated by the low-pass filtering and unit magnitude conversion in phase-noise filter 407. The second term in Eq. (10) is typically includes many remote-terminal signals. In the example of maximum antenna gain differential, developed earlier, the channel noise has a normalized spectral density relative to the hub-terminal received signal component of −35 dB. The remote-terminal signals, in this example, are on the order of 5 dB above the channel noise and when the band is fully occupied they represent a wideband signal noise with normalized spectral density relative to the hub-terminal received signal component of about −30 dB. The phase-noise signal component, p(t), in phase-noise estimate 406A is constant over the effective integration time of phase-noise filter 407. The low-pass filtering of phase noise estimate 406A in phase-noise filter 407 attenuates the wideband signal noise and channel noise components. In the above example, with a phase-noise filter bandwidth of 100 kHz relative to the hub-terminal signal bandwidth of about 10 MHz, corresponding to the maximum constellation symbol rate of 14.76 E+6 Hz with a symbol waveform filter roll-off of about 35%, an additional 20 dB is realized of wideband signal noise and channel noise reduction. The unit-magnitude vector conversion after filtering in phase-noise filter 407 further reduces the residual noise by about 3 dB. The conversion to a unit magnitude vector is conventionally accomplished with a Read-Only-Memory (ROM). Filtering in phase-noise filter 407 does not affect the power in the phase-noise signal component that in a 100 kHz bandwidth is about −33 dB relative to a unit-normalized carrier. The residual noise present in phase-noise error signal 407A is then about 33−30−20−3=−20 dB relative to the phase-noise signal component used for additional cancellation. This value sets a cancellation limit of 33+20=53 dB, which is greater than the cancellation goal of 45 dB for the maximum antenna gain differential example, described previously.

The phase-noise error signal 407A modulates in phase-noise modulator 408 a subcarrier at the constellation converter frequency 409B provided from time-frequency synchronizer 409. The resulting phase-noise modulated subcarrier is used in offset converter/filter 402 to provide the narrowband offset-constellation signal 402A that includes the phase-noise variations. The narrowband offset-constellation signal 402A is used in subband equalizer 403 to cancel the phase-noise modified relayed-interference in narrowband received signal 404A. It is recognized that rather than multiply the phase-noise error signal 407A by the constellation signal 401A by means of the offset converting operation in unit 402, this multiplication could equally be accomplished prior to offset-converter/filter 402 and no subcarrier modulation is required in phase noise modulator 408.

Subband equalizer 403 requires adaptation of the complex weight in order to track changes in gain, phase, and frequency that would degrade the relayed-interference cancellation. The common solution to equalization adaptation is to minimize the mean squared error (MSE) of an appropriately defined error signal. For relayed-interference cancellation in the present invention, this error signal is the demodulated subband signal 403B. The MSE equalizer function to be minimized is convex, i.e. bowl shape, with respect to the weight, so the minimum can always be found from any point on the function by adjusting the weight so as to move in the opposite direction of the gradient. Since the gradient is zero at the minimum corresponding to the bottom of the bowl, such a gradient algorithm must converge to the optimum function value. In communications problems the signals have random characteristics and the gradient corresponds to a mean value that necessarily requires some time to compute. In the estimated gradient algorithm the gradient is replaced by a random process whose average is equal to the gradient. The estimated gradient in this application is the product of the narrowband offset-constellation signal 402A and the complex conjugate of the demodulated subband signal 403B. This estimated gradient algorithm has been widely used in adaptive equalizers and is often also called the "least mean squares" or LMS algorithm. See John Proakis, Digital Communications, McGraw-Hill, New York, N.Y., 1983, pg. 369.

The input signals to subband equalizer 403 are narrowband and are represented by samples with a sampling period $T_P$ where $1/T_P$ is the subband symbol clock that is tracking the frequency and phase of the remote-terminal subband symbol clock $R_R$ for the constellation modulation. For the $T_P$ sampling period there are samples $\hat{A}_P = \hat{a}(pT_P)$ of narrowband offset-constellation signal 402A denoted as $\hat{a}(t)$ and samples $Z_P = z(pT_P)$ of demodulated subband signal 403B denoted as $z(t)$. The estimated gradient product in the LMS algorithm for the complex weight W is $Z_p^* \hat{A}_p$ so the weight update is at $t = pT_P$ $$W(p+1) = W(p) - sZ_p^* \hat{A}_p \qquad (11)$$

where s is an algorithm step size that determines convergence rate and an excess mean-square error.

Figure 6:
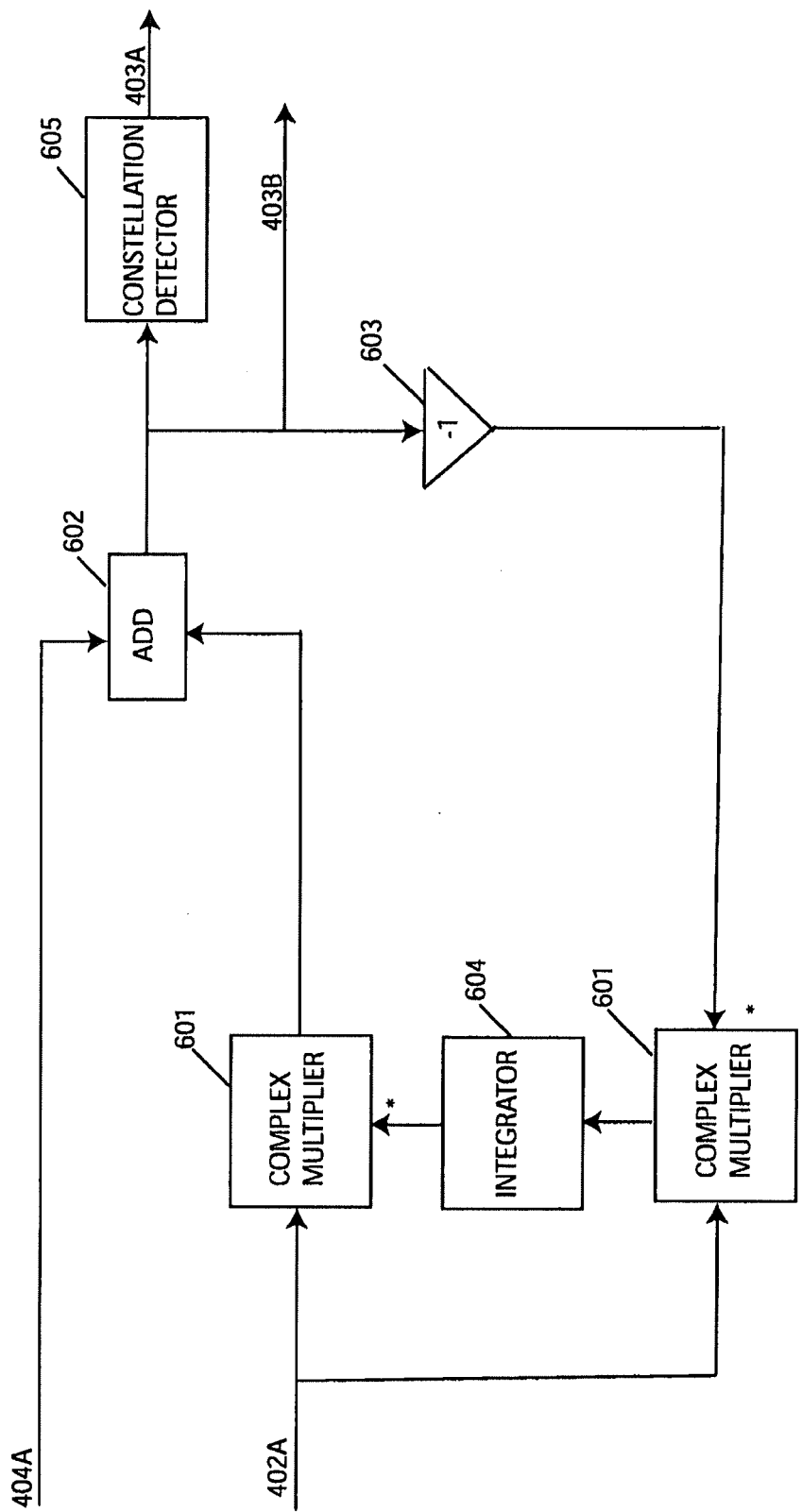
FIG. 6 is a block diagram of the subband equalizer of FIG. 4.

FIG. 6 illustrates the subband equalizer 403 and the weight adaptation given by Eq. (11). The narrowband offset-constellation signal 402A is multiplied by the complex weight in complex multiplier 601 (the asterisk in FIG. 6 indicates the complex conjugation operation) to produce an equalized signal that is added in the "add" device 602 with the narrowband received signal 404A to produce the demodulated subband signal 403B with reduced relayed-interference. The demodulated subband signal 403B is an optimum estimate of the transmitted constellation signal sent from the remote terminal. In a system without error-correction coding, the digital data modulated into the constellation is extracted in constellation detector 605 that detects the closest possible transmitted constellation value and converts the detected constellation value into digital data. Conventionally, constellation detector includes de-interleaving and error-correction decoding that uses the optimum estimates 403B as "soft" decisions to produce the transmitted information digital data. The estimated gradient algorithm inverts the sign of the demodulated subband signal 403B for multiplication and attenuation scaling in complex multiplier 601 by the narrowband offset constellation signal 402A and subsequent integration in integrator 604 to update the complex weight in accordance with Eq. (11).

The excess error in subband equalizer 403 can be determined from a misadjustment factor. If the mean energy in narrowband offset-constellation signal 402A is E the excess error is measured by a misadjustment factor $$M = sE/2 \qquad (12)$$

that results in a mean-square error (MSE) after weight convergence relative to the minimum mean-square error (MMSE) of $$\text{MSE} = (1+M)\text{MMSE} \qquad (13)$$

The MMSE is approximately equal to the power in the remote-terminal signal that can be 30 dB smaller than mean energy E. To achieve at least a 45 dB cancellation the misadjustment factor M must then be smaller than −15 dB. The choice of an algorithm step size equal to 0.0316/E according to Eq. (13) provides about a 3 dB margin in attaining this level of cancellation.

In this LMS application the convergence is exponential with a time constant approximately equal to $$\tau = T_P/sE \qquad (14)$$

For s=0.0316/E the time constant is $T_P/0.0316$ corresponding to an equalizer loop bandwidth of $0.0316/(2\pi T_P)$ Hz. For the typical example of a 50 kHz remote-terminal subband symbol rate, the subband equalizer-sampling period is 20 microseconds and the subband equalizer requires a loop bandwidth of 250 Hz or less. Time variations of satellite link parameters are significantly slower than this equalizer loop bandwidth. By using an even smaller loop bandwidth (smaller step size) larger cancellation levels of the relayed hub-terminal constellation signal can be achieved subject to the limits on cancellation set by residual uncancelled phase noise.

The present invention has been described in detail, including preferred embodiments. However, it should be recognized that those skilled in the art, upon considering this disclosure, may make modifications and improvements within the spirit and scope of this invention.

What is claimed is:

1. A method for producing a demodulated subband signal in an asymmetrical point-to-multipoint radio link, that includes a satellite transponder, at a hub communication terminal that transmits a digital-data signal with a constellation alphabet in a transmitted signal to a plurality of remote terminals and that receives at a center frequency, equal to a carrier frequency and a carrier error frequency, a received signal, that contains a subband signal from a remote terminal, with a subband symbol waveform, and the subband signal is located, relative to the carrier frequency, at the sum of an offset frequency and an offset error frequency, and the received signal contains relayed interference corresponding to a modified version of the transmitted signal that has been relayed by the satellite transponder, comprising the steps of:

wideband baseband-converting the received signal by a wideband converter frequency to provide a wideband-received signal;

time-delaying the digital-data signal with a time-delay parameter that depends on the wideband-received signal to provide a delayed digital-data signal;

constellation modulating the delayed digital-data signal into a constellation signal with said constellation alphabet and an associated constellation clock;

multiplying the constellation signal and a shift signal that has a subcarrier at a constellation converter frequency to provide an offset-constellation signal;

interference-component matched filtering, with the subband symbol waveform, the offset-constellation signal to provide a narrowband offset-constellation signal;

offset baseband-converting the received signal by an offset converter frequency to provide an offset-received signal;

signal-component matched filtering, with the subband symbol waveform, the offset-received signal to provide a narrowband-received signal;

combining the product of the narrowband offset-constellation signal and a complex equalizer weight with the narrowband-received signal to provide the demodulated subband signal.

2. The method of claim 1 where the wideband converter frequency is equal to the sum of the carrier frequency and a carrier error frequency estimate, the constellation converter frequency is equal to the carrier error frequency estimate plus the negative of the sum of the offset frequency and an offset error frequency estimate, and the offset converter frequency is the sum of the carrier frequency, the offset error frequency estimate, and the offset frequency.

3. The method of claim 2 wherein the complex equalizer weight in the combining step is updated by the estimated-gradient product of the narrowband offset-constellation signal and the demodulated subband signal.

4. The method of claim 1 wherein the multiplying step further includes producing a sample-timing error signal, that is derived from in-phase and quadrature components of the wideband received signal, the constellation signal, and the time-derivative of the constellation signal, and adjusting the constellation clock by said sample-timing error signal.

5. The method of claim 4 wherein circuit delay compensation in the offset/converter filter is provided by adjusting an interpolated time-delay that depends on the sum of in-phase and quadrature products of the time derivative of the constellation signal and the demodulated subband signal.

6. The method of claim 5 wherein a magnitude measure of the transmitted signal is delayed by the time-delay parameter to produce a delayed magnitude measure that is used in the constellation modulating step to adjust the amplitude of the constellation signal.

7. The method of claim 1 wherein the shift signal in the multiplying step includes subcarrier modulation by a phase-noise error signal that is the filtered product of the wideband received signal and the constellation signal.

8. A communication terminal comprising:
a transmitter with a digital-data signal that is used to produce a transmitted signal, with a constellation alphabet and wideband symbol waveform; and
a receiver that down-converts a received signal to a terminal intermediate frequency to provide a received IF signal, that contains relayed interference corresponding to a modified version of the transmitted signal at a center frequency, equal to the sum of a carrier frequency and a carrier error frequency, that is nominally equal to the terminal intermediate frequency and that further contains a subband signal, with a subband symbol waveform that has a bandwidth small compared to the wideband symbol waveform, and the subband signal is located relative to the carrier frequency at a frequency equal to the sum of an offset frequency and an offset error frequency, and the received IF signal is provided to a subband signal demodulator that processes a receiver-replica digital-data signal and the received IF signal to produce a demodulated subband signal, said subband signal demodulator further comprising:
a wideband-baseband converter that converts the received IF signal from the terminal intermediate frequency by a wideband converter frequency to produce a wideband-received signal;
a buffer that time delays the receiver-replica digital-data signal by a time-delay parameter that depends on the wideband-received signal to produce a delayed digital-data signal;
a constellation modulator that converts the delayed digital-data signal into a constellation signal with said constellation alphabet and an associated constellation clock;
an offset converter/filter that multiplies the constellation signal by a shift signal that has a subcarrier at a constellation upconverter frequency and subsequently match filters the product with the subband symbol waveform to produce a narrowband offset-constellation signal;
an offset baseband-converter that converts the received IF signal by an offset converter frequency to produce an offset-received signal that is subsequently match filtered with the subband symbol waveform to produce a narrowband-received signal; and
a subband equalizer that combines the product of the narrowband offset-constellation signal and a complex equalizer weight with the narrowband-received signal to produce the demodulated subband signal.

9. The communication terminal of claim 8 where the wideband converter frequency is equal to the sum of the carrier frequency and a carrier error frequency estimate, the constellation converter frequency is equal to the carrier error frequency estimate plus the negative of the sum of the offset frequency and an offset error frequency estimate, and the offset converter frequency is the sum of the carrier frequency, the offset error frequency estimate, and the offset frequency.

10. The communication terminal of claim 9 wherein the subband equalizer provides weight updates of the complex equalizer weight by the estimated-gradient product of the narrowband offset-constellation signal and the demodulated subband signal.

11. The communication terminal of claim 8 wherein a time-frequency synchronizer provides a sample-timing error signal, that is derived from in-phase and quadrature components of the wideband received signal, the constellation signal, and the time-derivative of the constellation signal, and adjusting the constellation clock by said sample-timing error signal.

12. The communication terminal of claim 11 wherein the time-frequency synchronizer provides circuit delay compensation in the offset converter/filter by adjusting an interpolated time-delay that depends on the sum of in-phase and quadrature products of the time derivative of the constellation signal and the demodulated subband signal.

13. The communication terminal of claim 8 wherein the receiver-replica digital data is produced from a transfer of the digital-data signal from the transmitter to the receiver with broadcasts in a wired local area network.

14. The communication terminal of claim 13 wherein a magnitude measure of the transmitted signal is additionally provided to the buffer and the buffer time delays the magnitude measure by the time-delay parameter to produce a delayed magnitude measure that is provided to the constellation modulator where it is used to adjust the amplitude of the constellation signal.

15. The communication terminal of claim 8 wherein the receiver-replica digital data is produced from demodulation of the wideband-received signal.

16. The communication terminal of claim 8 wherein the shift signal in the offset converter/filter includes subcarrier modulation by a phase-noise error signal that is the filtered product of the wideband received signal and the constellation signal.

* * * * *